United States Patent
Gandhi et al.

(10) Patent No.: US 11,687,926 B2
(45) Date of Patent: Jun. 27, 2023

(54) PRIVACY PROTECTED CONSUMERS IDENTITY FOR CENTRALIZED P2P NETWORK SERVICES

(71) Applicant: VISA INTERNATIONAL SERVICE ASSOCIATION, San Francisco, CA (US)

(72) Inventors: Raj Gandhi, Foster City, CA (US); Gyan Prakash, Foster City, CA (US); Yue Chen, Foster City, CA (US); Ketki Gawande, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 186 days.

(21) Appl. No.: 16/510,175

(22) Filed: Jul. 12, 2019

(65) Prior Publication Data
US 2021/0012329 A1 Jan. 14, 2021

(51) Int. Cl.
*G06Q 20/38* (2012.01)
*G06Q 20/40* (2012.01)
*G06Q 20/22* (2012.01)

(52) U.S. Cl.
CPC ......... *G06Q 20/383* (2013.01); *G06Q 20/223* (2013.01); *G06Q 20/4016* (2013.01)

(58) Field of Classification Search
CPC ............ G06Q 20/383; G06Q 20/4016; G06Q 20/223; G06Q 20/027; G06Q 20/405; G06Q 20/381
See application file for complete search history.

(56) References Cited

U.S. PATENT DOCUMENTS

| | | | | |
|---|---|---|---|---|
| 10,846,679 | B2 * | 11/2020 | Oliynyk | G06Q 20/325 |
| 2012/0284175 | A1 * | 11/2012 | Wilson | G06Q 20/10 |
| | | | | 705/39 |
| 2013/0211967 | A1 * | 8/2013 | Ogilvy | G06Q 20/12 |
| | | | | 705/26.82 |
| 2013/0238488 | A1 * | 9/2013 | Bouey | G06Q 20/405 |
| | | | | 705/39 |
| 2015/0286997 | A1 * | 10/2015 | Zimmerman | G06Q 20/367 |
| | | | | 705/39 |
| 2017/0116615 | A1 * | 4/2017 | Burgess | G06Q 20/322 |
| 2020/0013028 | A1 * | 1/2020 | Black | G06Q 20/4012 |
| 2020/0167769 | A1 * | 5/2020 | Green | G06Q 20/3825 |
| 2022/0020016 | A1 * | 1/2022 | Scott | G06Q 20/40 |

* cited by examiner

*Primary Examiner* — Jacob C. Coppola
*Assistant Examiner* — Vincent I Idiake
(74) *Attorney, Agent, or Firm* — K&L Gates LLP

(57) ABSTRACT

A method of communicating a payment request from a first payment platform to a second payment platform is disclosed. The method may receive a payment request from a sending user on the first payment platform to a receiving user on the second payment platform where the payment request from the sending user is translated into a protected payment request. In response to the sending user being known, the protected payment request may be communicated to the second payment platform. An acceptance of the protected payment request from the second payment platform may be received. A transaction settlement request may be communicated to the first payment platform and the second payment platform.

14 Claims, 7 Drawing Sheets

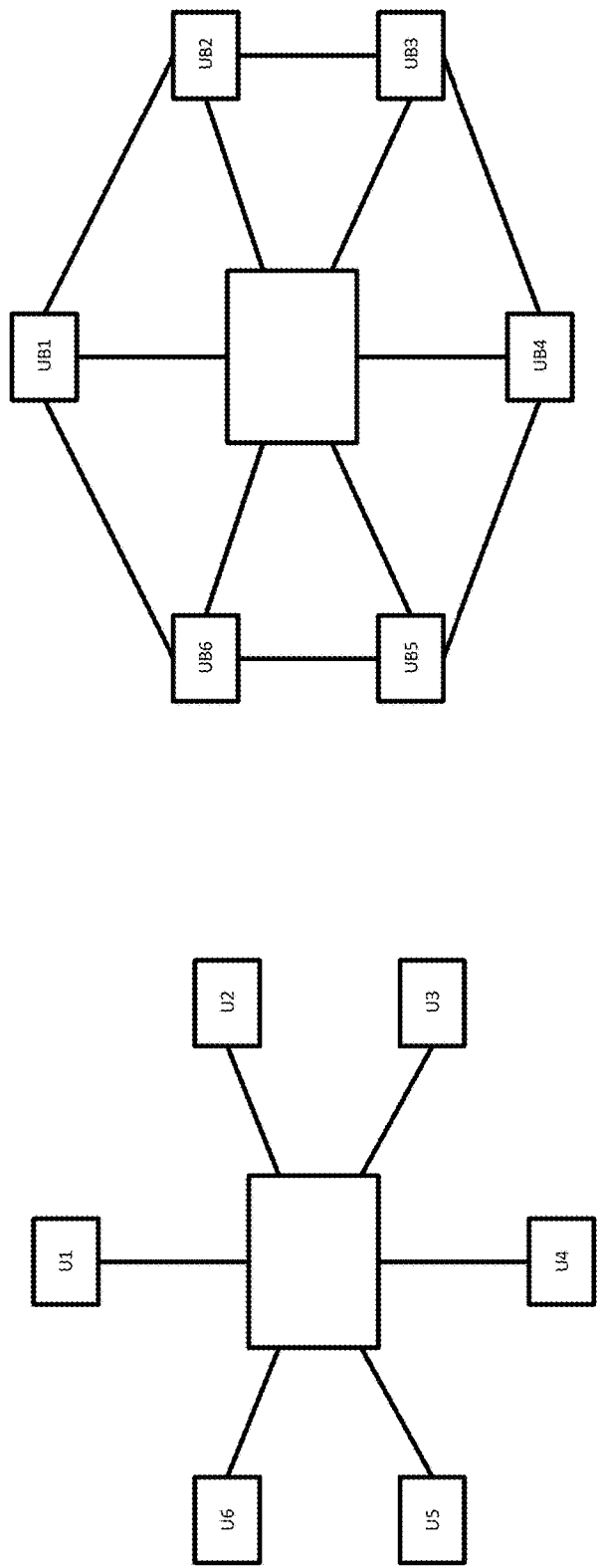
FIG. 1B
FIG. 1A
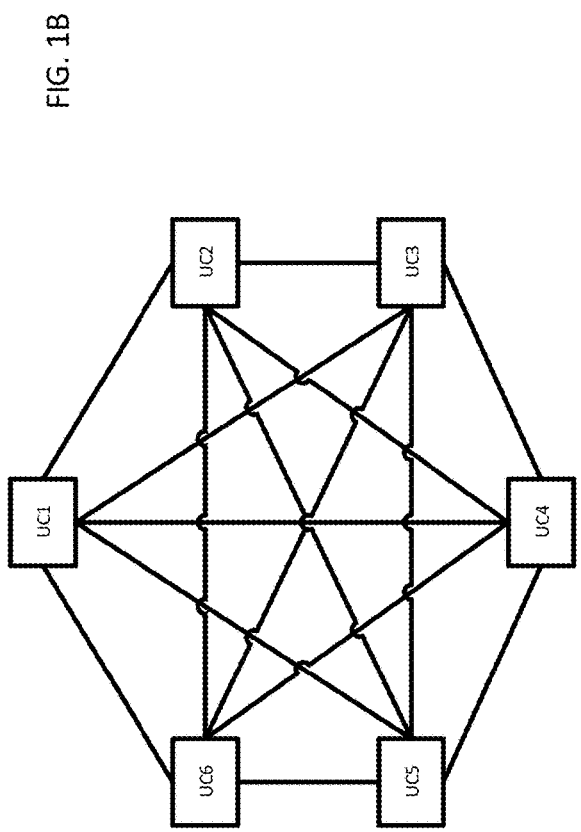
FIG. 1C

PRIVACY PROTECTED CONSUMERS IDENTITY FOR CENTRALIZED P2P NETWORK SERVICES

BACKGROUND

As technology advances, more and more platforms have developed to transfer value from one user to another. There may be advantages and disadvantages to each of the platforms. In many platforms, the ability to transfer value to other platforms may be limited or impossible which may cause adoption of the various platforms to be slow. Logically, if the platforms cannot work with each other, a first user of a first platform may not be able to communicate value to a second user on a second platform.

Related, in order for the platforms to work together, there has to be some sharing of data between the platforms. Data for transferring value may be sensitive data to the users as it may be personally identifiable information and users may be hesitant to share the data across a variety of unknown and untrusted platforms. Similarly, the platforms may be sensitive to sharing data of its users as other platforms may not be as trustworthy or may attempt to steal the clients of the other platforms.

SUMMARY

A method of communicating a payment request from a first payment platform to a second payment platform is disclosed. The method may receive a payment request from a sending user on the first payment platform to a receiving user on the second payment platform where the payment request from the sending user is translated into a protected payment request. The protected processing request may be reviewed to ensure the sending user is known. In response to the sending user being known, the protected payment request may be communicated to the second payment platform. An acceptance of the protected payment request from the second payment platform may be received and the acceptance may be communicated to the first payment platform. A transaction settlement request may be communicated to the first payment platform and the second payment platform.

BRIEF DESCRIPTION OF THE DRAWINGS

FIG. 1A is an illustration of a payment platform;
FIG. 1B is an illustration of another payment platform;
FIG. 1C is an illustration of yet another payment platform.

SPECIFICATION

Figure 2:
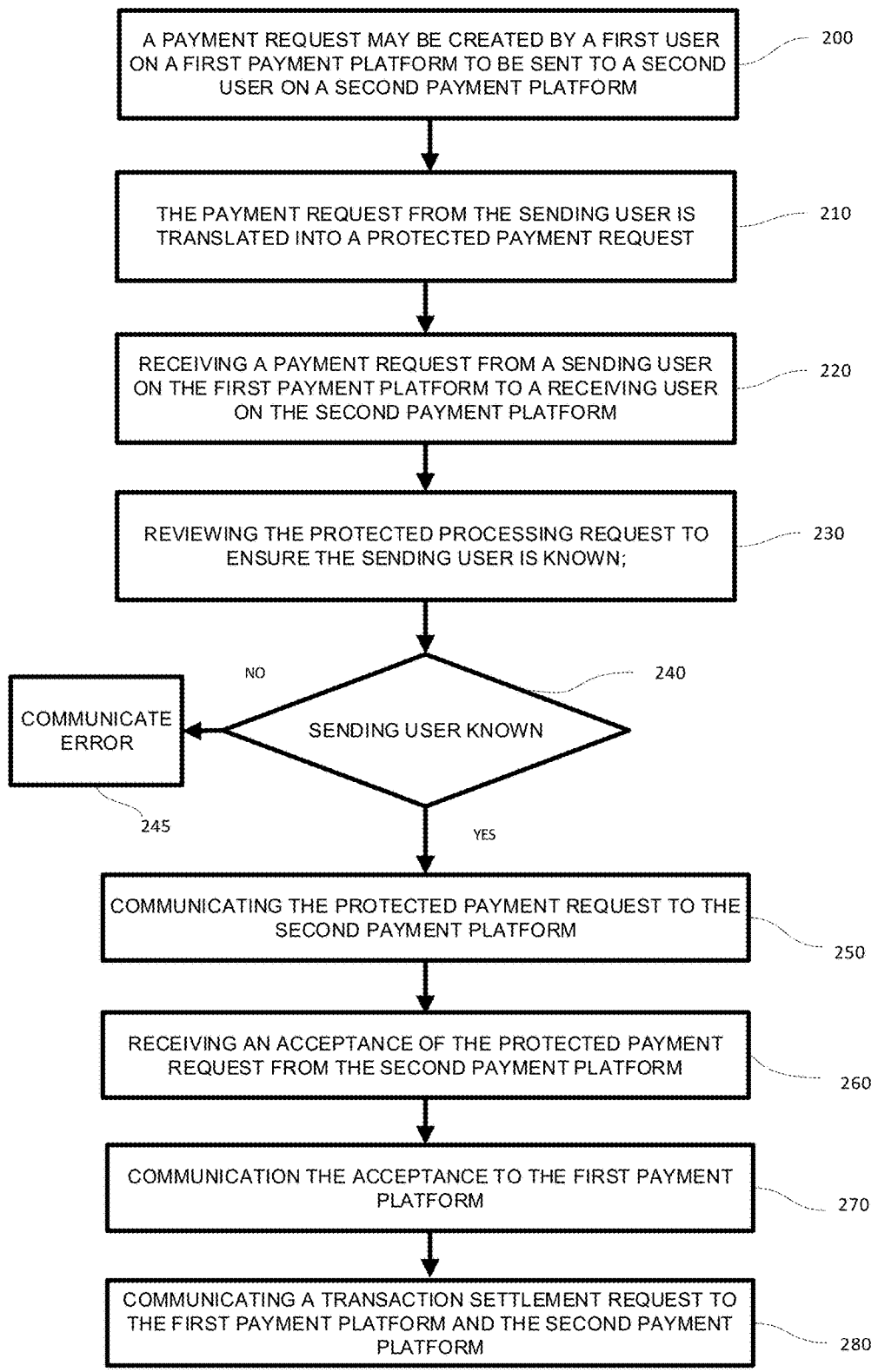
FIG. 2 is a flowchart of a method in accordance with the claims.

The present system, method and tangible memory device now will be described more fully with reference to the accompanying drawings, which form a part hereof, and which show, by way of illustration, specific exemplary embodiments by which the system, method and tangible memory device may be practiced. These illustrations and exemplary embodiments are presented with the understanding that the present disclosure is an exemplification of the principles of one or more system, method and tangible memory devices and is not intended to limit any one of the system, method and tangible memory devices to the embodiments illustrated. The system, method and tangible memory device may be embodied in many different forms and should not be construed as limited to the embodiments set forth herein; rather, these embodiments are provided so that this disclosure will be thorough and complete, and will fully convey the scope of the system, method and tangible memory device to those skilled in the art. Among other things, the present system, method and tangible memory device may be embodied as methods, systems, computer readable media, apparatuses, components, or devices. Accordingly, the present system, method and tangible memory device may take the form of an entirely hardware embodiment, an entirely software embodiment, or an embodiment combining software and hardware aspects. The hardware may be local, may be remote or may be a combination of local and remote. The following detailed description is, therefore, not to be taken in a limiting sense.

As technology advances, more and more platforms have developed to transfer value from one user to another. There may be advantages and disadvantages to each of the platforms. In many platforms, the ability to transfer value to other platforms may be limited or impossible which may cause adoption of the various platforms to be slow. Logically, if the platforms cannot work with each other, a first user of a first platform may not be able to communicate value to a second user on a second platform.

FIGS. 1A, 1B and 1C may illustrate some sample payment networks. In FIG. 1A, payments from users U1-U6 may be routed through a central hub which may handle accounting for the transfers. FIG. 1B may illustrate a system where payments may go peer to peer (U1B-U6B) from some users and through a central hub for others which may also perform an accounting function. FIG. 1C may illustrate a system where payments may go direct from peer to peer (U1C-U6C) and through a central hub for others which may also perform an accounting function. Logically, additional designs and layouts are possible and are contemplated. All these payment systems and more may be contemplated as being able to interact with each other through the described system and method. In each of these methods, U1-U6 can only pay other U nodes, UB1-UB6 can only pay other UB nodes and UC1-UC6 can only pay other UC nodes. Thus, U1 could not pay UB1 or UC1 or UC6 and so on.

In order for the platforms to work together, there has to be some sharing of data between the platforms. Data for transferring value may be sensitive data to the users as it may be personally identifiable information and users may be hesitant to share the data across a variety of unknown and untrusted platforms. Similarly, the platforms may be sensitive to sharing data of its users as other platforms may not be as trustworthy or may attempt to steal the clients of the other platforms.

FIG. 2 may illustrate a method and system 213 in accordance of the claims of the application for receiving a payment request from a sending user on the first payment platform 217 to a receiving user on the second payment platform 219.

Initially, partner payment systems 217 219 may have to be on-boarded to the system. The on-boarding may be a manual step where partner payment platforms 217 219 may be verified and on-boarded assuming they agree to follow the rules of the system 213. In other embodiments, the onboarding may be electronic and may be interactive as data is entered and verified. Depending on the security being used, PKI keys may be exchanged or hashing algorithms may be agreed upon. In simple terms hashing means taking an input string of any length and giving out an output of a fixed length.

Once a partner payment system is on-boarded, a secure method of communication between the system 213 and the partner may be created. The secure communication may use PKI trust to create a trusted communication channel between the service and the payment partners. In other embodiments, a dedicated secure channel may be available and access methods may be agreed upon.

At a high level, the various participating payment platforms 217 219 may not share personally identifiable information with the system 213 or with other participating payment platforms. In this way, the various payment platforms 217 219 may be less concerned about client information being stolen or clients being targeted to change payment systems. For example, the owner of the payment system U in FIG. 1 may not want its clients known by the UB system as UB platform may try to attract the U users to UB platform. The various systems will create protected identifications (PPIs) which will only be used to facilitate transactions and not to identify the members of the various payment systems 217 219.

Logically, payment partners 217 219 may have some access into the system 213. The payment partner 217 219 may create a user id and password or other verification to access the system 213 when needed. In addition, in some embodiments, the payment partners 217 219 may be able to upload existing users to the system 213 to speed the verification of the first and second users of the various payment platforms 217 219 if desired updates. Logically, if a hashing algorithm is used, the names may be hashed in advance.

At block 200, a payment request may be created by a first user on a first payment platform 217 to be sent to a second user where the second user may use a second payment platform 219. For example, Anne may use PayKwik as a payment platform and she may wish to send money to Biff who may use Tranzwise as a payment platform and PayKwik may not be capable of communicating money directly to Tranzwise.

At block 210, the payment request from the sending user on the sending platform 217 may be translated into a protected payment request. In some embodiments, the translation may be accomplished on the device the first user is using to make the request. For example, an app may be installed on a portable computing device such as a smart phone and the app may create the protected payment request. In other embodiments, the protected payment request may be made by a remote server to which the first user's computing device may be in secure communication.

The protected payment request may have request elements and the elements may vary depending on the situation. In one embodiment, the request elements may include at least one of a sender id, a receiver id, an amount and a payment platform id. The sender id or the receiver id may include at least one of an email address, a phone number and an account number. Of course, there may be additional request elements such as a timing element, a note regarding the purpose of the payment, phone number, country, state, city, time since registration, etc. The sender id may depend on the payment system being used as some payment systems rely on phone numbers, while other payment systems rely on user selected ids. Of course, other sender ids are possible and are contemplated.

The request elements may be translated into a protected payment request using a variety of functions. In one embodiment, a hash function is used to translate the request elements into the protected payment request. Thus the hash of the sending user in the payment request may be compare to stored hash results from authorized users of the first payment platform.

In another embodiment, a token may be used to communicate the request elements. A token may be a created by a trusted computing entity and the token represents the request elements but if someone intercepts the token, it will not contain useful information. If a trusted party receives the token, it may be converted back into useful information. A token may be communicated to the sending user and the sending user may communicate the token to the receiving user where the token may be tied to the receiving user. In some additional embodiments, the sending user may communicate the token using a different communication channel to further ensure the safety of the communication. Logically, the token may be submitted by the receiving user to one of a plurality of platforms for payment.

The system 213 and method may also determine which payment platform 219 the second user is an authorized user. In one embodiment, databases of members of the various platforms may be available and may be queried to determine the second platform used by the second user. For example, the system 213 may query the various platforms that are part of the system 213 for members that match Biff who is scheduled to receive money from Anne.

If the first and second user use the same payment platform, the transaction may be relatively easy as making payments across the same platform are what each platform are designed to support.

In another embodiment, the various platforms may use API to allow the platforms to be quickly queried to see if a second user is a member of the second or receiving platform 219. For example, the system 213 may communicate some or all of the user data to an API of the second payment platform 219 and the second payment platform 219 may respond with a symbol to indicate whether the second user is a member of the queried payment system 219.

Logically, if hashes of data representing the second user are used, a hash of the receiving user id may be compared to hashes of authorized user id of additional payment platforms. In this way, sensitive data will not be communicated or be made available to additional platforms but accurate matches may be made as a result of the hash function.

In other embodiments, a payment platform may be used that includes key exchange encryption. The system 213 may exchange keys with one or more payment platforms and only if the key exchange is approval will information be exchanged.

If the receiver user (Biff) is determined to not be an authorized user of a second payment platform, the receiver may be invited to join a payment platform. In this way, the receiving user may receive the results of the transaction and the sending user may be able to complete the transaction.

Some receiving users may still be hesitant to join a payment platform. For example, some senior citizens may not have the technological skills to use some transfer platforms. Similarly, some users may have privacy concerns and may desire to not have the privacy risks. Thus an option may be available for the receiver to receive a debit card for the payment amount. The receiving user may have to enter a mailing address and the debt card may be mailed to the address. In yet another embodiment, am electronic file may be communicated which may be an electronic debit card which may be displayed to a merchant for payment, such as displaying a qr code or displaying a bar code which may be read and used for payment.

A sample transaction and validation request may start with a message from the sender which may include:
  Sender protected id
  Receiver protected id
  Amount
  Currency Type
  PSP (payment service provider)

As previously mentioned, the hash of the protected payment request should be the same in both the sending and receiving system. In embodiments where PKI keys are used, the receiver id should be the same in the sending and receiving system.

At block 220, the protected payment request may be received by the service 213 from a sending user on the first payment platform 217 to a receiving user on the second payment platform 219.

At block 230, the protected payment request may be reviewed to ensure the sending user is known at block 240. Logically, the system 213 and method will want to ensure the sending user is part of the sending platform 217 and is not viewed as a risk. If the sender is not known, an error may be communicated at block 245. In some embodiments, the sending user may have a determined rating based on the likelihood that the transaction is fraudulent. For example, a match may be made to a sending user but the match may be a from a fraudulent user. Common fraud techniques such as reviewing IP addresses, comparing the proposed transaction to past transactions, using machine learning to evaluate the fraud potential, etc., are all possible and are contemplated.

The sender id may include a variety of information. In some embodiments it may include one or two of a hash of an email registered with a payment platform, a hash of a phone number registered with the payment platform, a single digit to indicate when users registered with the payment platform for the first time, a county indication; a state indication; a transaction location of a user; and a know your customer indication. At a minimum, the sender id may include information sufficient to identifier the sender to know where to debit the sender for the transfer.

In some embodiments, additional checks may be made on the payment request. The system 213 may apply know your customer (KYC) rules and anti-money laundering (AML) rules to the proposed transactions. The system 213 may check the KYC status from the Sender and Receiver Protected IDs, as well as heuristic rules and evaluate the chance of fraud. For suspicious transaction requests, an AML Score may be generated (0.0-1.0) and send to receiver payment platform. In response to the fraud score being below a threshold, the method may be stopped. Similarly, KYC rules may be used to generate a KYC score and if the score is over a threshold, the method and system 213 may stop.

Figure 3:
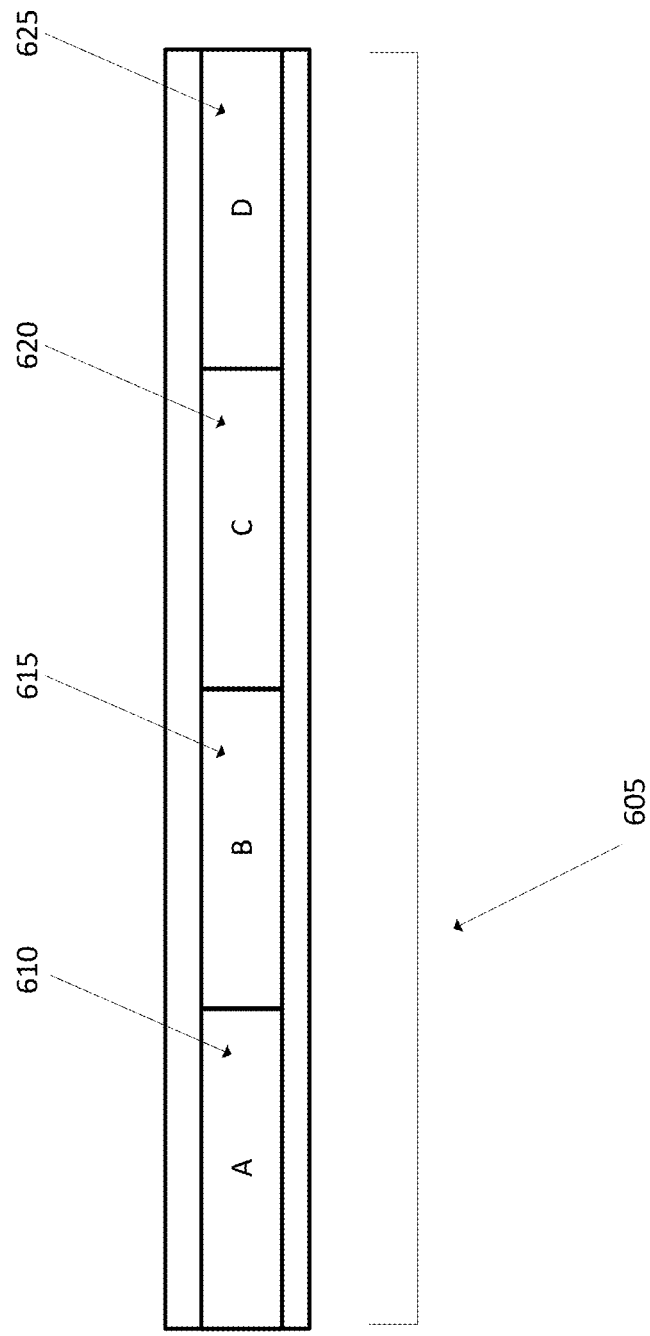
FIG. 3 may be an illustration of training data and testing data.
Figure 4A:
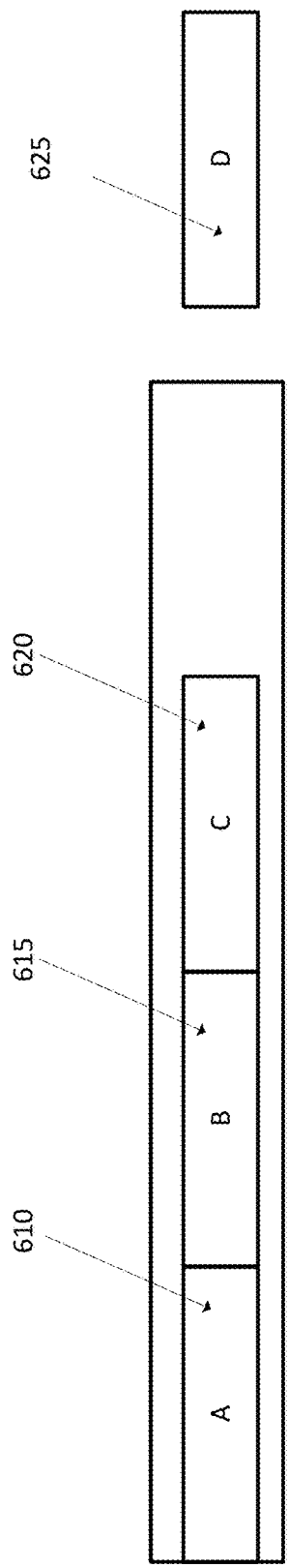
FIG. 4a may be an illustration of training data and testing data.
Figure 4B:
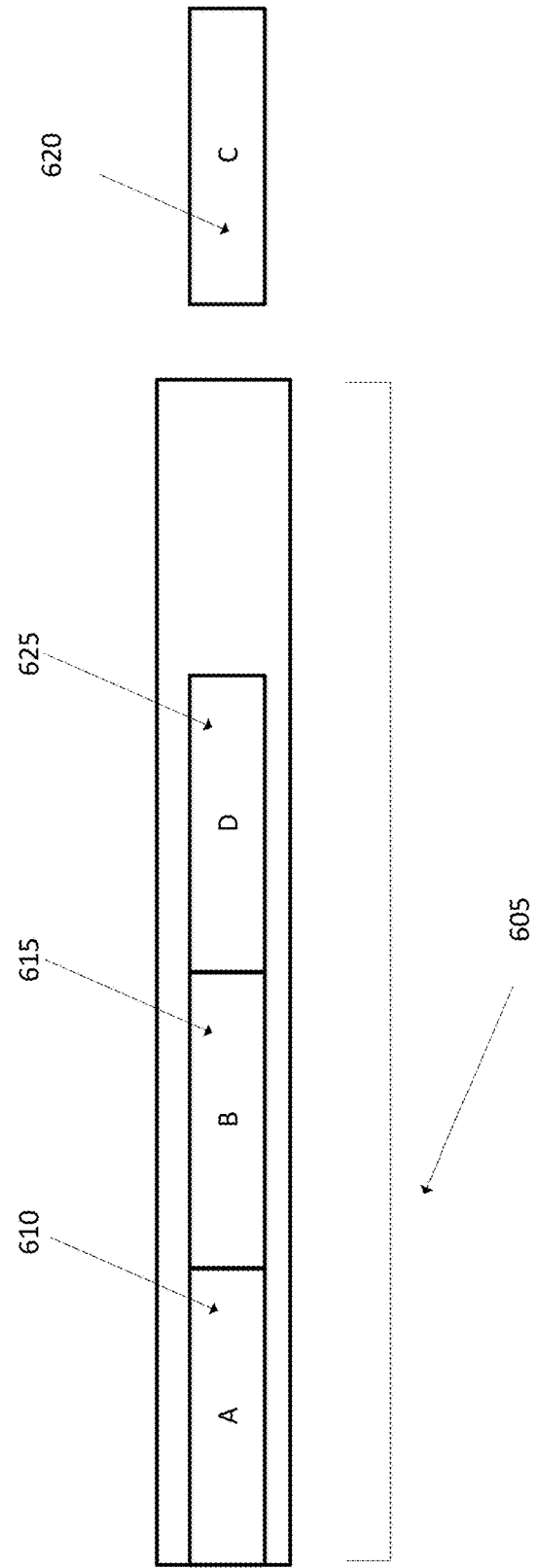
FIG. 4b may be an illustration of training data and testing data.

Overtime, the database of heuristic rules may improve by using machine learning to learn from past transactions to better detect fraud. Machine learning may be used to assist in determining a fraud rating or a know your customer rating. Machine learning may be used to review a training group of past fraud rating data (or know your customer rating data) and determine fraud ratings (or know your customer rating data) moving forward. FIG. 3 may illustrate a sample artificial intelligence (AI) training data according to one or more embodiments. As an example and not a limitation, an artificial intelligence system may trained by analyzing a set of training data 605. The training data may be broken into sets, such as set A 610, set B 615, set C 620 and set D 625. As illustrated in FIG. 4a, one set may be using as a testing set (say set D 625) and the remaining sets may be used as training set (set A 610, set B 615 and set C 620). The artificial intelligence system may analyze the training set (set A 610, set B 615 and set C 620) and use the testing set (set D 625) to test the model create from the training data. Then the data sets may shift as illustrated in FIG. 4b, where the test data set may be added to the training data sets (say set A 610, set B 615 and set D 625) and one of the training data sets that have not been used to test before (say set C 620) may be used as the test data set. The analysis of the training data (set A 610, set B 615 and set D 625) may occur again with the new testing set (set C 620) being used to test the model and the model may be refined. The rotation of data sets may occur repeatedly until all the data sets have been used as the test data sets. The model then may be considered complete and the model may then be used on additional data sets.

At block 250, in response to the sending user being known, the protected payment request may be communicated to the second payment platform 219. The communication may be in a variety of electronic format and may follow a known protocol. As the payment platforms may have known protocols or API, the appropriate format may be followed.

At block 260 an acceptance of the protected payment request may be received from the second payment platform 219. Logically, if the protected payment request is not in the correct format, it will be rejected and the first user may desire to know that the payment did not proceed as planned. In some embodiments, the problem may be with the communication of the protected payment request and the request may have to be modified. In other embodiments, the second payment platform 219 may be having technical issues and the payment may have to be attempted again later.

In some embodiments, the second payment platform 219 may communicate an error if the protected payment request is not successful. The error message may be useful to verify that the payment was not success and may need to be attempted again or that the format of the messages needs to be corrected.

At block 270, assuming the payment was accepted by the second payment platform 219, the acceptance may be communicated to the first payment platform 217. Logically, the first payment platform 217 and the first user may desire to know that the transaction was successful such that the payment attempt does not have to be repeated. Similarly, if an error message was communicated, the error message may be analyzed to correct the message in the future.

At block 280 a transaction settlement request may be communicated to the first payment platform 217 and the second payment platform 219. The transaction settlement request may follow a known protocol and may ensure the transaction is executed as desired.

In some embodiments, the amount of the transfer may be communicated to the second user. In addition, the transfer amount may be communicated to the first user. As a result, both the first and second users may be confident the transfer has occurred and for the proper amount.

Figure 5:
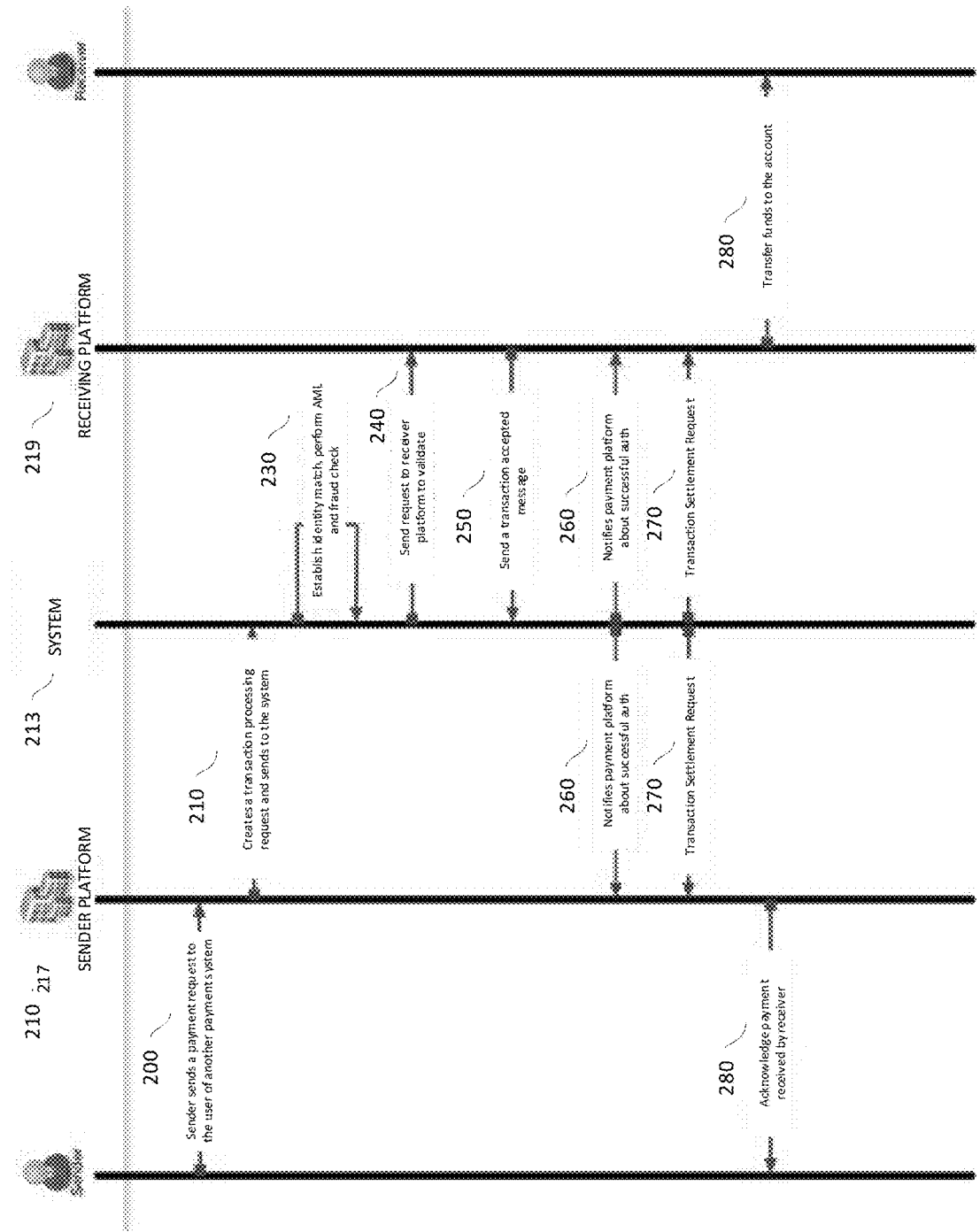
FIG. 5 may be an additional flow diagram.

A sample transaction format may be as follows and may be illustrated in FIGS. 2 and 5:

Sending Payment Platform sends the following data to the Service

```
{ "senderPID":{
    "privacyProtectedEmail":"65D7A28E8A45399B980BCBFBB1002E0F41E972909D2
95D4DEA05145BD71805DA",
    "privacyProtectedPhoneNumber":"EA1E5D2FA237513F800CDC7F610544085D526
123F117EF549E0F1D48EAA00B89",
    "userRegistered":1,
    "registeredLocationOfUser":"USA | CA | Foster City",
    "geo-location":"37.558706, -122.277510",
    "kycStatus":1
},
"receiverPID":{
    "email":"abc@yahoo.com",
    "phoneNumber":"4444444444",
    "userRegistered":3,
    "registeredLocationOfUser":"USA | TX | Austin",
    "kycStatus":1
},
    "amount":"50",
    "currency":"USD",
    "pspID":"PSP00010213"
}
```

The system 213 generates the privacy protected id of the receiver's email and phone number and searches in the database (populated from data of other PSPs)

Once the identity match is found, the system 213 may perform fraud and AML checks and may sends request to receiver Payment Service Platform (PSP) 219 to validate.

```
{
    "senderPID":{
        "privacyProtectedEmail":"65D7A28E8A45399B980BCBFBB1002E0F41E972909D2
95D4DEA05145BD71805DA",
        "privacyProtectedPhoneNumber":"EA1E5D2FA237513F800CDC7F610544085D526
123F117EF549E0F1D48EAA00B89",
        "userRegistered":1,
        "registeredLocationOfUser":"USA | CA | Foster City",
        "geo-location":"37.558706, -122.277510",
        "kycStatus":1
    },
    "receiverPID":{
        "email":"abc@yahoo.com",
        "phoneNumber":"4444444444",
        "userRegistered":3,
        "registeredLocationOfUser":"USA | TX | Austin",
        "kycStatus":1
    },
    "amount":"50",
    "currency":"USD"
}
```

A receiver PSP 219 may validate on their end and may send an acceptance message to the system 213.

Use Cases

Several use cases may be described below.

Case 1: Receiving User is Registered with Multiple PSPs

Assumptions:

User 1 (user sending money) is registered customer of PSP1 217. User 1 is not registered with PSP2 219.

User 2 (user receiving money) is a registered customer of PSP2 219 and PSP 3, but not registered with PSP1 217.

PID information of User 1 and User 2 is already shared with the Service 213 at the time of on-boarding of PSPs 217 219.

Figure 6:
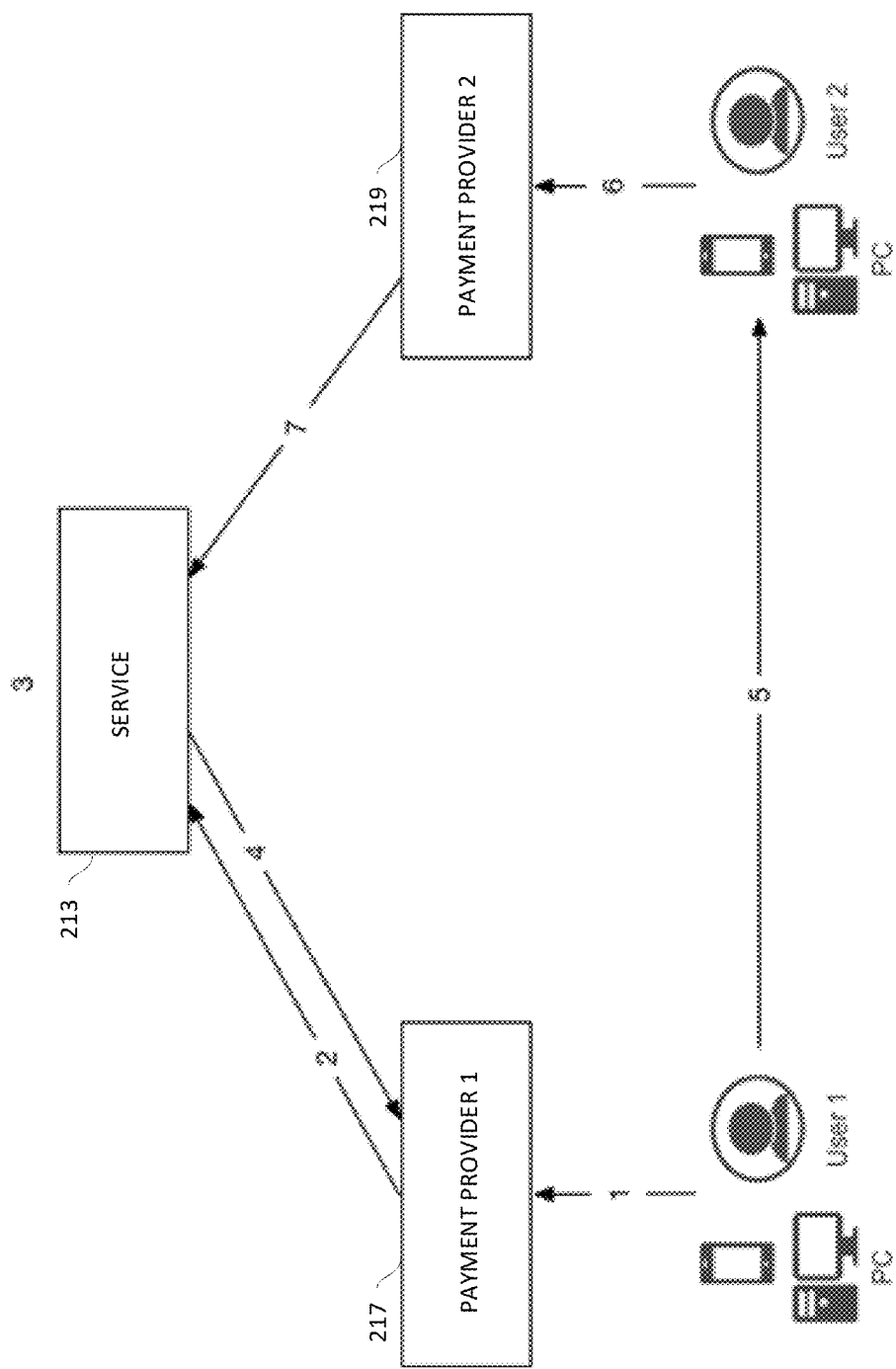
FIG. 6 may be a situational flow diagram.

Transaction Workflow as illustrated in FIG. 6:

User 1 makes a request to PSP1 2217 that he/she wants to send money to user 2 (registered with some other PSP 219). User 1 provides the amount to send and user 2's email or phone number Since user 2 is not registered with PSP1 217, PSP1 217 makes a request to the service with the payment information and user 1 and user 2's PID The service searches for user 2 in all the data sources from all PSPs. Multiple match for user 2 are found which means user 2 is a registered customer of more than 1 PSPs The service generates a unique payment token which is tied to user 2's email/phone and the amount that user 1 wants to send and gives this token to PSP1 217 and finally to user 1

User 1 shares this unique payment token with User 2 via any communication medium like text message, social media messengers, WhatsApp and more or manually User 2 receives the token and knows that he/she can redeem this token on any of the PSP where he is already registered. User 2 decides to redeem the token with PSP2 219

PSP2 219 makes a request to the service for validation along with User 2's email/phone hash and unique payment token. The service validates the token and matches the receiver's email/phone with User 2's email/phone. If validation is successful, User 2 receives the amount in his account with PSP2 219

Case 2: Receiving User is Registered with One PSPs
Assumptions:
User 1 (user sending money) is registered customer of PSP1 217. User 1 is not registered with PSP2 219
User 2 (user receiving money) is a registered customer of PSP, but not registered with PSP1 217
Hashed email and phone number information of User 1 and User 2 is already shared with the service at the time of on-boarding of PSPs 217 219
Transaction Workflow as Illustrated in FIG. 6:
User 1 makes a request to PSP1 217 that he/she wants to send money to user 2 (registered with some other PSP 219). User 1 provides the amount to send and user 2's email or phone number
As user 2 is not registered with PSP1 217, PSP1 217 makes a request to the service with the payment information and user 1's email/phone hash
The service searches for user 2 in all the data sources from all PSPs. One match for user 2 is found which means user 2 is a registered customer of one of the PSP 219
The service generates a unique payment token which is tied to user 2's email/phone and the amount that user 1 wants to send and gives this token to PSP1 217 and finally to user 1
User 1 shares this unique payment token with User 2 via any communication medium like text message, social media messengers, WhatsApp and more or manually
User 2 receives the token and knows that he/she can redeem this token with PSP2 219
PSP2 219 makes a request to the service for validation along with User 2's email/phone hash and unique payment token. The service validates the token and matches the receiver's email/phone with User 2's email/phone. If validation is successful, User 2 receives the amount in his account with PSP2 219

Figure 7:
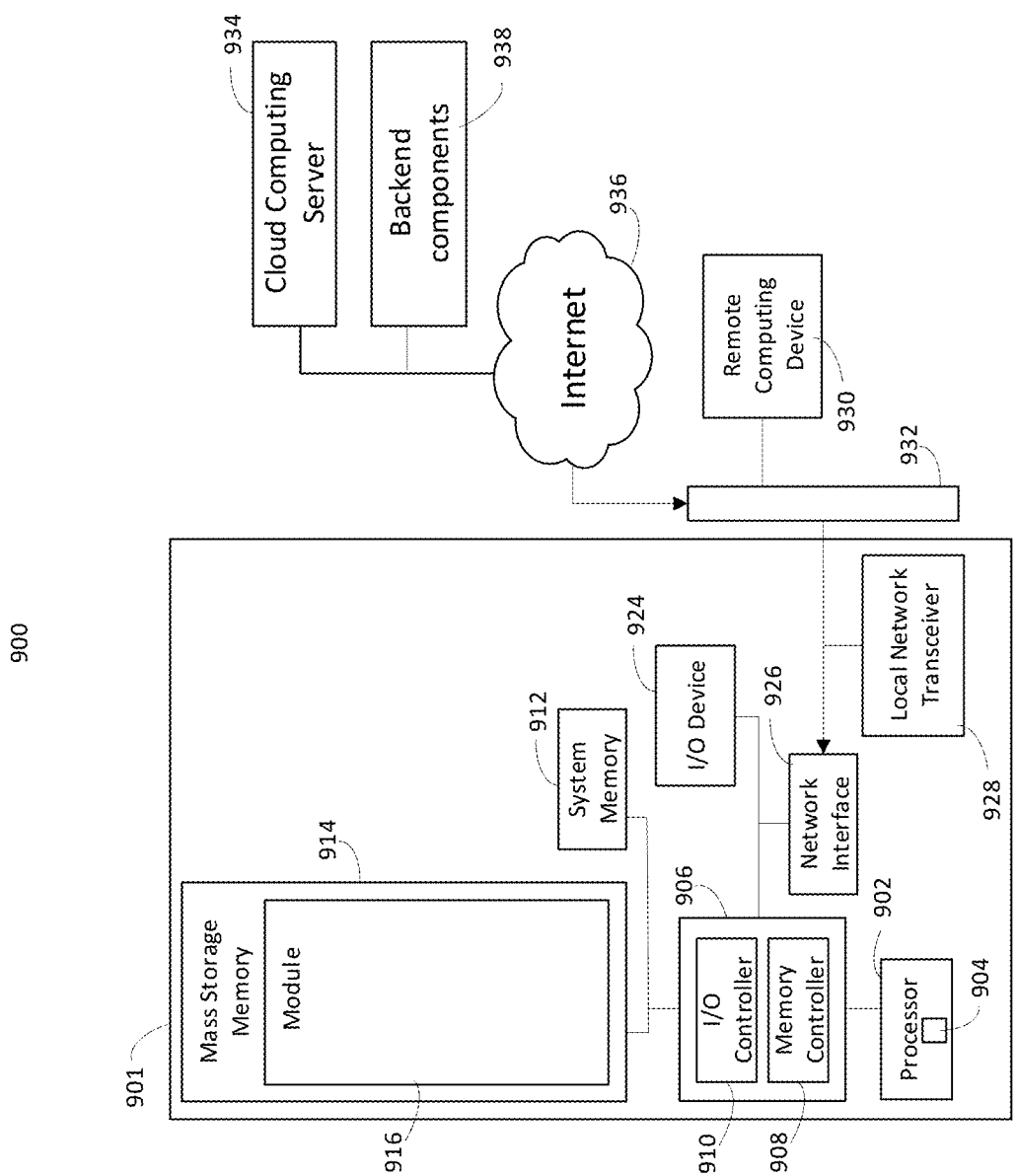
FIG. 7 may be an illustration of a sample computing device.

Case 3: Receiving User is not Registered with any PSP
Assumptions:
User 1 (user sending money) is registered customer of PSP1 217
User 2 (user receiving money) not registered with any PSP
Hashed email and phone number information of User 1 is already shared with the service at the time of on-boarding of PSPs 217 219
Transaction Workflow as illustrated in FIG. 6:
User 1 makes a request to PSP1 217 that he/she wants to send money to user 2 (registered with some other PSP). User 1 provides the amount to send and user 2's email or phone number
Since user 2 is not registered with PSP1 217, PSP1 217 makes a request to the service with the payment information and user 1's email/phone hash
The service searches for user 2 in all the data sources from all PSPs. However, no valid match is found as User 2 is not registered with any PSP
The service updates PSP1 217 that User 2 is not found in the database and provides an option for User 1 to pay user 2 using a Prepaid debit card As illustrated in this specification, many computers may be used by the system 213. FIG. 7 may illustrate a sample computing device 901. The computing device 901 includes a processor 902 that is coupled to an interconnection bus. The processor 902 includes a register set or register space 904, which is depicted in FIG. 7 as being entirely on-chip, but which could alternatively be located entirely or partially off-chip and directly coupled to the processor 902 via dedicated electrical connections and/or via the interconnection bus. The processor 902 may be any suitable processor, processing unit or microprocessor. Although not shown in FIG. 7, the computing device 901 may be a multi-processor device and, thus, may include one or more additional processors that are identical or similar to the processor 902 and that are communicatively coupled to the interconnection bus.

The processor 902 of FIG. 7 is coupled to a chipset 906, which includes a memory controller 908 and a peripheral input/output (I/O) controller 910. As is well known, a chipset typically provides I/O and memory management functions as well as a plurality of general purpose and/or special purpose registers, timers, etc. that are accessible or used by one or more processors coupled to the chipset 906. The memory controller 908 performs functions that enable the processor 902 (or processors if there are multiple processors) to access a system memory 912 and a mass storage memory 914, that may include either or both of an in-memory cache (e.g., a cache within the memory 912) or an on-disk cache (e.g., a cache within the mass storage memory 914).

The system memory 912 may include any desired type of volatile and/or non-volatile memory such as, for example, static random access memory (SRAM), dynamic random access memory (DRAM), flash memory, read-only memory (ROM), etc. The mass storage memory 914 may include any desired type of mass storage device. For example, the computing device 901 may be used to implement a module 916 (e.g., the various modules as herein described). The mass storage memory 914 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 901, the systems and methods described herein. Thus, a module, block, function, operation, procedure, routine, step, and method can be implemented in hardware, firmware, and/or software. In one embodiment, program modules and routines are stored in mass storage memory 914, loaded into system memory 912, and executed by a processor 902 or can be provided from computer program products that are stored in tangible computer-readable storage mediums (e.g. RAM, hard disk, optical/magnetic media, etc.).

The peripheral I/O controller 910 performs functions that enable the processor 902 to communicate with a peripheral input/output (I/O) device 924, a network interface 926, a local network transceiver 928, (via the network interface 926) via a peripheral I/O bus. The I/O device 924 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 924 may be used with the module 916, etc., to receive data from the transceiver 928, send the data to the components of the system 100, and perform any operations related to the methods as described herein. The local network transceiver 928 may include support for a Wi-Fi network, Bluetooth, Infrared, cellular, or other wireless data transmission protocols. In other embodiments, one element may simultaneously support each of the various wireless protocols employed by the computing device 901. For example, a software-defined radio may be able to support multiple protocols via downloadable instructions. In operation, the computing device 901 may be able to periodically poll for visible wireless network transmitters (both cellular and local network) on a periodic basis. Such polling may be possible even while normal wireless traffic is being supported on the computing device 901. The network interface 926 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 908 and the I/O controller 910 are depicted in FIG. 7 as separate functional blocks within the chipset 906, the functions performed by these blocks may be integrated within a single integrated circuit or may be implemented using two or more separate integrated circuits. The computing environment 900 may also implement the module 916 on a remote computing device 930. The remote computing device 930 may communicate with the computing device 901 over an Ethernet link 932. In some embodiments, the module 916 may be retrieved by the computing device 901 from a cloud computing server 934 via the Internet 936. When using the cloud computing server 934, the retrieved module 916 may be programmatically linked with the computing device 901. The module 916 may be a collection of various software platforms including artificial intelligence software and document creation software or may also be a Java® applet executing within a Java® Virtual Machine (JVM) environment resident in the computing device 901 or the remote computing device 930. The module 916 may also be a "plug-in" adapted to execute in a web-browser located on the computing devices 901 and 930. In some embodiments, the module 916 may communicate with back end components 938 via the Internet 936.

The system 900 may include but is not limited to any combination of a LAN, a MAN, a WAN, a mobile, a wired or wireless network, a private network, or a virtual private network. Moreover, while only one remote computing device 930 is illustrated in FIG. 6 to simplify and clarify the description, it is understood that any number of client computers are supported and can be in communication within the system 900.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A method of communicating a payment request from a first payment platform to a second payment platform, the method comprising:
receiving, from the first payment platform at a service computing device, a protected payment request generated by a sending user via the first payment platform and intended for a receiving user associated with the second payment platform, wherein the protected payment request includes at least:
a payment amount,
a receiver ID, and
a hashed sender ID generated by translating a sender ID associated with the sending user using a hash function;
reviewing, by the service computing device, the protected payment request to confirm that the sending user is a known user of the first payment platform by comparing the hashed sender ID to stored known hashed user IDs that are associated with the first payment platform;
in response to confirming that the sending user is a known user of the first payment platform:
generating a hashed receiver ID by translating the receiver ID from the protected payment request using the hash function, and
identifying the second payment platform by searching a user database for the hashed receiver ID, the user database including matches of known users with a plurality of additional payment platforms including the second payment platform;
in response to identifying the second payment platform, generating, by the service computing device, a unique payment token including the hashed receiver ID and the payment amount of the protected payment request;
communicating, from the service computing device, the unique payment token to the first payment platform for delivery to a first computing device associated with the sending user, wherein the first computing device communicates the unique payment token to a second computing device associated with the receiving user and the second computing device redeems the token with the second payment platform;

receiving, at the service computing device from the second payment platform, a request for validation including the unique payment token and the hashed receiver ID;

validating the unique payment token at the service computing device by matching the hashed receiver ID to the receiver ID included in the protected payment request; and communicating the validation from the service computing device to the second payment platform.

2. The method of claim 1, further comprising determining a fraud score for the protected payment request by the service computing device, determining if the fraud score is below a threshold, and in response to the fraud score being below the threshold, stopping the method.

3. The method of claim 1, further comprising determining a money laundering score for the protected payment request by the service computing device, determining if the money laundering score is below a threshold, and in response to the money laundering score being below a threshold, stopping the method.

4. The method of claim 1, further comprising determining, by the service computing device, whether the receiving user is an authorized user of the second payment platform.

5. The method of claim 1, further comprising communicating the amount of value to a second computing device associated with the receiving user.

6. The method of claim 1, wherein the token is configured to be communicated to the second computing device using a different communication channel.

7. The method of claim 6, wherein the token is configured for being submitted by the receiving user to the second payment platform for payment.

8. The method of claim 4, further comprising if the receiving user is determined by the service computing device to not be an authorized user of the second payment platform, inviting the receiving user to join a payment platform.

9. The method of claim 8, further comprising offering the receiving user a debit card for a payment amount associated with the protected payment request.

10. The method of claim 1, wherein the sender ID or the receiver ID comprises at least one of an email address, a phone number and an account number.

11. The method of claim 1, further comprising adding a payment platform to the service computing device using key exchange encryption to communicate necessary on-boarding information..

12. The method of claim 1, wherein the hashed sender ID further comprises at least two of:
a hash of an email registered with a payment platform;
a hash of a phone number registered with the payment platform;
a single digit to indicate when users registered with the payment platform for a first time;
a county indication;
a state indication;
a transaction location of a user; and
a know your customer indication.

13. A computer system comprising a processor, a memory and an input-output circuit wherein the processor is physically configured according to computer executable instructions for:

receiving, from a first payment platform, a protected payment request generated by a sending user via the first payment platform and intended for a receiving user associated with a second payment platform, wherein the protected payment request includes at least:
a receiver ID, and
a hashed sender ID generating by translating a sender ID associated with the sending user using a hash function;

reviewing the protected payment request to confirm that the sending user is a known user of the first payment platform by comparing the hashed sender ID to stored known hashed user IDs that are associated with the first payment platform;

in response to confirming that the sending user is a known user of the first payment platform:
generating a hashed receiver ID by translating the receiver ID from the protected payment request using the hash function, and
identifying the second payment platform by searching a user database for the hashed receiver ID, the user database including matches of known users with a plurality of additional payment platforms including the second payment platform;

in response to identifying the second payment platform, generating, by the service computing device, a unique payment token including the hashed receiver ID and the payment amount of the protected payment request;

communicating the unique payment token to the first payment platform for delivery to a first computing device associated with the sending user, wherein the first computing device communicates the unique payment token to a second computing device associated with the receiving user and the second computing device redeems the token with the second payment platform;

receiving, from the second payment platform, a request for validation including the unique payment token and the hashed receiver ID;

validating the unique payment token at the service computing device by matching the hashed receiver ID to the receiver ID included in the protected payment request; and communicating the validation to the second payment platform.

14. The computer system of claim 13, further comprising:
determining a fraud score for the protected payment request and in response to the fraud score being below a threshold, stopping the method; and
determining a money laundering score for the protected payment request and in response to the money laundering score being below a threshold, stopping the method.

* * * * *